United States Patent
Wang et al.

(10) Patent No.: US 10,331,648 B2
(45) Date of Patent: Jun. 25, 2019

(54) METHOD, DEVICE AND MEDIUM FOR KNOWLEDGE BASE CONSTRUCTION

(71) Applicant: Xiaomi Inc., Beijing (CN)

(72) Inventors: Pingze Wang, Beijing (CN); Zhijun Chen, Beijing (CN); Fei Long, Beijing (CN)

(73) Assignee: XIAOMI INC., Beijing (CN)

( * ) Notice: Subject to any disclaimer, the term of this patent is extended or adjusted under 35 U.S.C. 154(b) by 308 days.

(21) Appl. No.: 15/241,245

(22) Filed: Aug. 19, 2016

(65) Prior Publication Data

US 2017/0052995 A1    Feb. 23, 2017

(30) Foreign Application Priority Data

Aug. 20, 2015 (CN) .......................... 2015 1 0515887

(51) Int. Cl.
| | |
|---|---|
| *G06F 7/02* | (2006.01) |
| *G06F 16/00* | (2019.01) |
| *G06F 16/23* | (2019.01) |
| *G06F 16/215* | (2019.01) |
| *G06F 16/33* | (2019.01) |
| *G06F 17/27* | (2006.01) |

(52) U.S. Cl.
CPC ............ *G06F 16/23* (2019.01); *G06F 16/215* (2019.01); *G06F 16/334* (2019.01); *G06F 17/278* (2013.01)

(58) Field of Classification Search
CPC ......... G06F 17/30011; G06F 17/30684; G06F 17/30917; G06F 17/2735; G06F 17/30345; G06F 17/30675; G06F 17/30303; G06F 17/278; G06F 16/93; G06F 16/951; G06F 16/953; G06F 16/3344; G06F 16/86; G06F 16/23; G06F 16/25

See application file for complete search history.

(56) References Cited

U.S. PATENT DOCUMENTS

| | | |
|---|---|---|
| 7,257,530 B2 | 8/2007 | Yin |
| 2004/0073548 A1 | 4/2004 | Lim et al. |
| 2005/0086222 A1 | 4/2005 | Wang et al. |

(Continued)

FOREIGN PATENT DOCUMENTS

| | | |
|---|---|---|
| CN | 101630314 A | 1/2010 |
| CN | 102033950 A | 4/2011 |

(Continued)

OTHER PUBLICATIONS

Machine translation of CN 104239500 as cited in Aug. 22, 2016 IDS (Year: 2014).*

(Continued)

*Primary Examiner* — Bruce M Moser
(74) *Attorney, Agent, or Firm* — Brinks Gilson & Lione

(57) ABSTRACT

A method, device and medium for constructing a knowledge base is described, wherein the knowledge base construction based on retrieving text information, determining whether the text information includes at least first information according to a predefined property description pattern, extracting the first information from the text information when the first information is determined to be included in the text information, and constructing the knowledge base based on the first information and an entity corresponding to the first information.

15 Claims, 12 Drawing Sheets

(56) References Cited

U.S. PATENT DOCUMENTS

| | | | | |
|---|---|---|---|---|
| 2009/0249182 A1* | 10/2009 | Symington | ............ | G06F 17/278 715/209 |
| 2011/0270882 A1* | 11/2011 | Jung | .................... | G06F 16/951 707/776 |
| 2012/0011428 A1* | 1/2012 | Chisholm | ............. | G06F 17/241 715/230 |
| 2015/0154509 A1 | 6/2015 | Lightner et al. | | |
| 2015/0324363 A1* | 11/2015 | Merg | .................... | G07C 5/006 707/730 |
| 2016/0063195 A1* | 3/2016 | Li | .......................... | G16H 40/20 705/2 |
| 2016/0154783 A1* | 6/2016 | Hebert | .................. | G06F 16/907 707/755 |
| 2017/0308523 A1* | 10/2017 | Wang | ..................... | G06Q 10/10 |

FOREIGN PATENT DOCUMENTS

| | | |
|---|---|---|
| CN | 102495892 A | 6/2012 |
| CN | 102866990 A | 1/2013 |
| CN | 103186556 A | 7/2013 |
| CN | 103631948 A | 3/2014 |
| CN | 104239500 A | 12/2014 |
| CN | 104573006 A | 4/2015 |
| CN | 104850554 A | 8/2015 |
| CN | 105138631 A | 12/2015 |
| EA | 008675 B1 | 6/2007 |
| JP | 2002-132812 A | 5/2002 |
| JP | 2010-521750 A | 6/2010 |
| KR | 10-2007-0018409 A | 2/2007 |
| KR | 10-2011-0132075 A | 12/2011 |
| RU | 2 541 198 C2 | 2/2015 |
| WO | WO 2014/000764 A1 | 1/2014 |
| WO | WO 2014/063118 A1 | 4/2014 |
| WO | WO 2015/084757 A1 | 6/2015 |

OTHER PUBLICATIONS

Etzioni, Oren et al., "Unsupervised Named-Entity Extraction from the Web: An Experimental Study," Artificial Intelligence, vol. 165, 2005, pp. 91-134.
Extended European Search Report dated Mar. 3, 2017 for European Application No. 16183633.3, 8 pages.
Office Action dated Dec. 21, 2016 for Korean Application No. 10-2016-7004142, 9 pages.
Office Action dated Jan. 19, 2018 for Chinese Application No. 201510515887.2, 8 pages.
Office Action dated Nov. 14, 2017 for Japanese Application No. 2017-534874, 4 pages.
Shinzato, Keiji et al., "Automatic Extraction of Attributes and Attribute Values from Product Description," The Association for Natural Language Processing, printed from the internet at <http://www.anlp.jp/proceedings/annual_meeting/2013/pdf_dir/B1-2.pdf>, 2013, pp. 7-10.
Tetsuro, Takahashi et al., "Automatic Extraction of Attribute Relations from Text," The Institute of Electronics Information and Communication Engineers, Technical Report of IEICE, 2004, pp. 19-24.
Final Office Action dated Mar. 29, 2017 for Russian Application No. 2016113502/08, 10 pages.
International Search Report corresponding with Int'l. Patent Application No. PCT/CN2015/097664 dated May 13, 2016, 13 pages.

* cited by examiner

METHOD, DEVICE AND MEDIUM FOR KNOWLEDGE BASE CONSTRUCTION

CROSS-REFERENCE TO RELATED APPLICATIONS

This application claims priority to Chinese Patent Application No. 201510515887.2, filed on Aug. 20, 2015, the entirety of which is hereby incorporated by reference herein.

TECHNICAL FIELD

The present disclosure relates to the field of artificial intelligence, and more particularly to a method, device and medium for knowledge base construction.

BACKGROUND

Named Entity Recognition (hereinafter NER), also called "exclusive name recognition", refers to recognition of certain entries included in text and categorizing the recognized entries into known categories such as, for example, person names, geography names, institution names, exclusive nouns, or the like.

Nutrient measurement of food may be a special type of recognized entry in text, which comprises the name and content of nutrients of a food item, such as "carbohydrate", "20 grams".

The nutrient measurement of food may be included in text found in forums, comments, blogs, news, Encyclopedia, or other electronic information presentation platform, where the nutrient measurement may be used to construct a knowledge base.

SUMMARY

According to a first exemplary embodiment of the present disclosure, a method for knowledge base construction is provided, wherein the method comprises: retrieving text information, and determining whether the text information include first information according to a predefined property description pattern, wherein the first information includes property information of entities in a predefined entity set; and extracting first information, if the first information is determined to be included in the text information, and constructing the knowledge base based on the first information and an entity corresponding to the first information.

According to a second exemplary embodiment of the present disclosure, a device for knowledge base construction is provided, wherein the device comprises: a processor; and a memory for storing processor-executable instructions; wherein the processor is configured to: retrieving text information, and determining whether the text information include first information according to a predefined property description pattern, wherein the first information includes property information of entities in a predefined entity set; and extracting first information, if the first information is determined to be included in the text information, and constructing the knowledge base based on the first information and an entity corresponding to the first information.

According to a third exemplary embodiment of the present disclosure, a non-transitory computer-readable storage medium is provided, the medium having stored therein instructions that, when executed by a processor of a computing device, causes the computing device to perform the first aspect of the embodiments or a method of the first aspect of the embodiments of the present disclosure.

BRIEF DESCRIPTION OF THE DRAWINGS

The accompanying drawings, which are incorporated in and constitute a part of this specification, illustrate embodiments consistent with the invention and, together with the description, serve to explain the features described herein.

DETAILED DESCRIPTION

Reference will now be made in detail to exemplary embodiments, examples of which are illustrated in accompanying drawings. The following description refers to the accompanying drawings in which the same numbers in different drawings represent the same or similar elements unless otherwise indicated. The implementations set forth in the following description of exemplary embodiments do not represent all implementations. Instead, they are merely examples of devices and methods consistent with aspects related to the features recited in the appended claims. The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Figure 1:
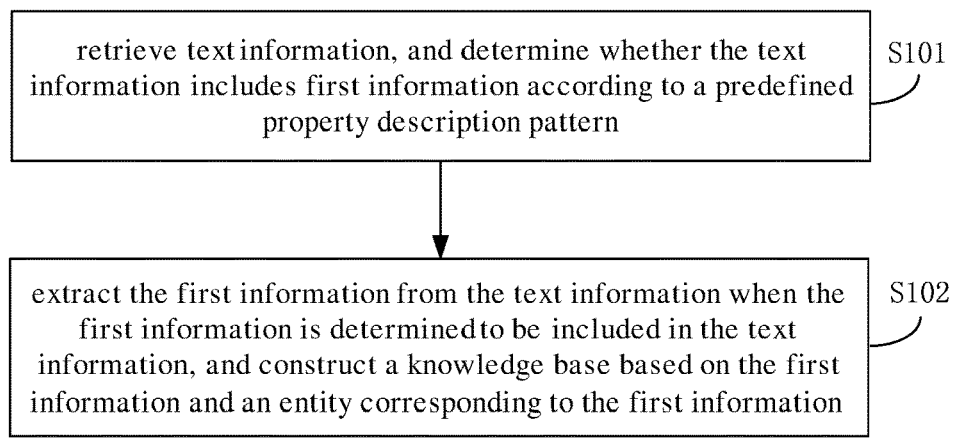
FIG. 1 shows a flow chart describing a method for knowledge base construction, according to an exemplary embodiment.

FIG. 1 shows a flow chart 100 of logic describing a method for knowledge base construction, according to an exemplary embodiment. The method for knowledge base construction may be implemented on and by a server in communication with a communication device. For example, the processes described by flow chart 100 may be implemented by an application running on the server for controlling component devices included on the server. The communication device may include well known computing systems, environments, and/or configurations suitable for implementing features of the method for knowledge base construction described herein such as, but are not limited to, smart phones, tablet computers, personal computers (PCs), server computers, handheld or laptop devices, multiprocessor systems, microprocessor-based systems, network PCs, server computers, minicomputers, mainframe computers, embedded systems, distributed computing environments that include any of the above systems or devices, and the like. The method may include the following processes.

At S101, text information may be retrieved from, for example, a local memory of the server or a database in communication with the server. The text information may be analyzed to determine whether the text information includes first information according to a predefined property description pattern. The text information may be representative of a collection of words such as a corpus, electronic document, electronic statement, or other electronic collection of words.

The predefined property description pattern may include a predetermined set of vocabulary words, a predetermined sentence pattern, or any combination thereof for determining whether the text information includes the first information. The first information may include characteristic information describing one or more entities included in a predefined entity set.

The entities included in the predefined entity set may include, for example, food items, air, sports, or the like. When the entity is a food item, the characteristic information describing the food item may be nutritional information corresponding to the food item. For example when the entity is food, the first information may describe specific nutritional information of the corresponding food item such as sugar, fiber, carbohydrate, protein, and the like.

When the entity is an air item, the characteristic information describing the air item may be constituents that comprise the air (e.g., nitrogen 78%, oxygen 21%, carbon dioxide 1%). When the entity is a sport, the characteristic information describing the sport may be an energy cost per hour attributed to engaging in the sport. Thus when the entity is a food item, the first information may comprise, but not be limited to, the nutritional information of the food item.

When the entity is the food item and a knowledge base describing nutritional information values for the food item is to be constructed, the predefined property description pattern corresponding to the food item may include, but not be limited to, one or more of the following patterns below:

content of * (e.g. the content of sugar), <contain|contains> <#NUM> grams of * (e.g., contain 20 grams of carbohydrate), * is <contained|included|contained rich> <in|within> * (e.g., vitamin C is contained rich in a kiwifruit). For example, the "*" character may be a wildcard character for matching any string, the "|" character may be a symbol representing and acting like a logical "or", the "<#NUM>" character string may be a symbol for matching a numerical string, and the "<" character and the ">" character may appear in pairs to identify multiple synonym words that are positioned in between the "<" and the ">" characters. For example, with reference to the identification of multiple synonym words, the exemplary line that states, "<contain|contains> <#NUM> grams of *" may indicate that "contains <#NUM> grams of *" may be equivalent to "contain <#NUM> grams of *" because "contains" has been identified to be treated as a synonym to "contains".

The server may parse the text information by using a data web-crawler application, and determine whether the text information contains the nutritional information values for the food item according to the predefined property description pattern based on the parsing.

At S102, the first information may be extracted from the text information when determined to be included in the text information, and the knowledge base may be constructed based on the first information and the corresponding entity. For example, the knowledge base may be constructed to include at least the first information and the corresponding entity When it is determined that the text information includes the nutritional information for the food item, the nutritional information may also be extracted, and stored into a database in association with the corresponding food item. The database may be in communication with the server, or be included as a component of the server.

It follows that the knowledge base may be automatically constructed by retrieving text information, analyzing the text information to determine whether first information is identified in the text information, extracting the first information from the text information when it is determined that the text information includes the first information, and constructing the knowledge base according to the first information and an entity corresponding to the first information. This process saves a user from manually mining for information, and also provides a more speedy and efficient method for constructing a knowledge base.

Figure 2:
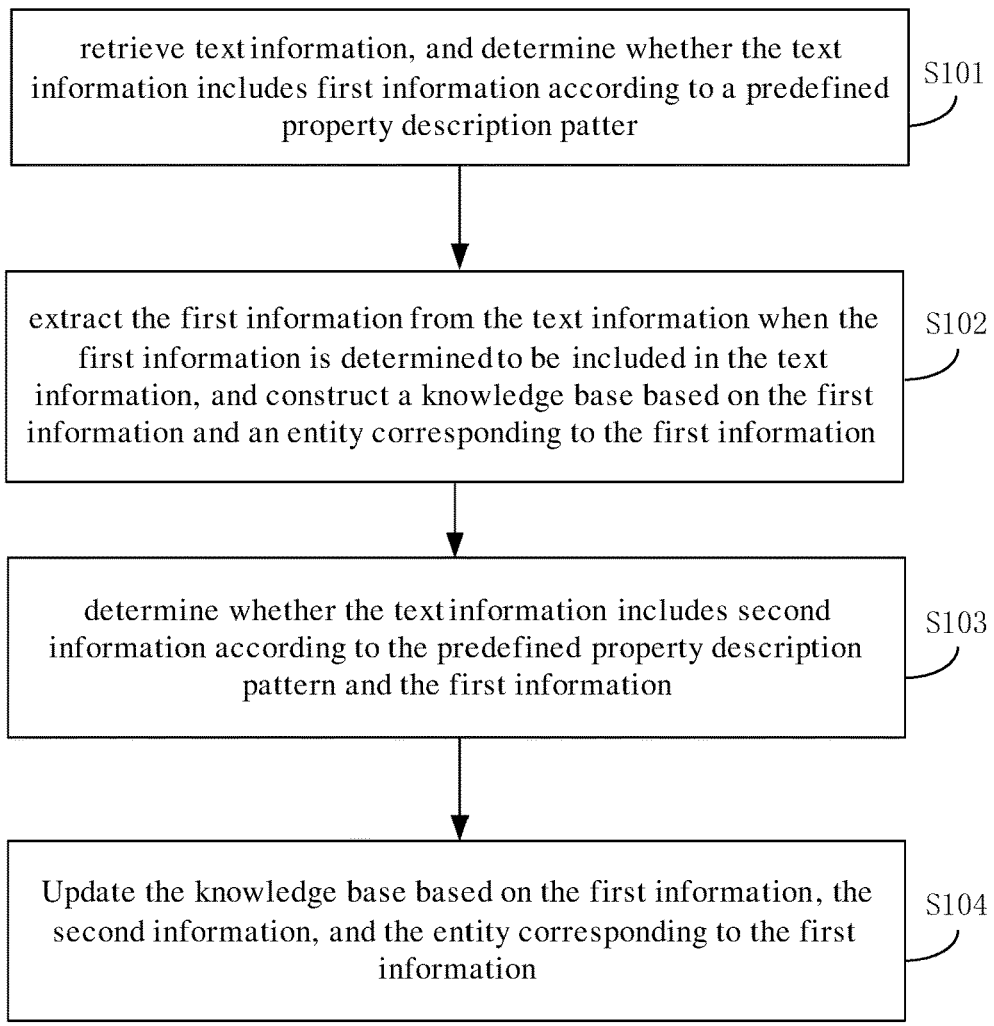
FIG. 2 shows a flow chart describing another method for knowledge base construction, according to an exemplary embodiment.

FIG. 2 shows a flow chart 200 of logic describing another exemplary method for knowledge base construction. As shown in FIG. 2, flow chart 200 describes a method that may additionally include processes described by S103-S104 that may be implemented after S102 described in flow chart 100.

At S103, a determination on whether the text information includes second information may be implemented according to the predefined property description pattern and the first information.

Wherein, the second information may include additional characteristic information relating to the first information. For example, when the first information describes nutritional information for the food item, the characteristic information of the second information may describe the content of the nutrients corresponding to the nutritional information described by the first information, i.e., the second information may be the content of the nutrients. For example, the second information may describe specific contents of the corresponding food item such as sugar content, fiber content, carbohydrate content, protein content, and the like. In addition or alternatively, the second information may describe a specific numerical value associated with a nutritional content of the food item such as 32 grams of protein, where the "32" from the 32 grams is identified as the second information. For example, when the first information is a type of fruit (e.g., an apple, orange, peach), the second information describes the nutritional components of that type of fruit.

It may be determined whether the text information includes the nutritional content of the food item, according to the above predefined property description pattern and the nutritional information described by the first information.

At S104, the second information may be extracted from the text information when the second information is determined to be included in the text information, and the knowledge base constructed from previous processes may be updated based on the first information, the second information, and the entity corresponding to the first information.

When it is determined that the text information includes the second information, such as the nutritional contents of the food item, the second information may be extracted from the text information, and the knowledge base may be constructed in accordance with the first information, the second information, and the entity corresponding to the first information, and thus the knowledge base construction is completed. For example, the knowledge base may be constructed to include at least the first information, the second information, and the entity corresponding to the first information.

It follows that the second information may be extracted from the text information when the second information is determined to be included in the text information, and the knowledge base may be constructed in accordance with the first information, the second information, and the entity corresponding to the first information.

Figure 3:
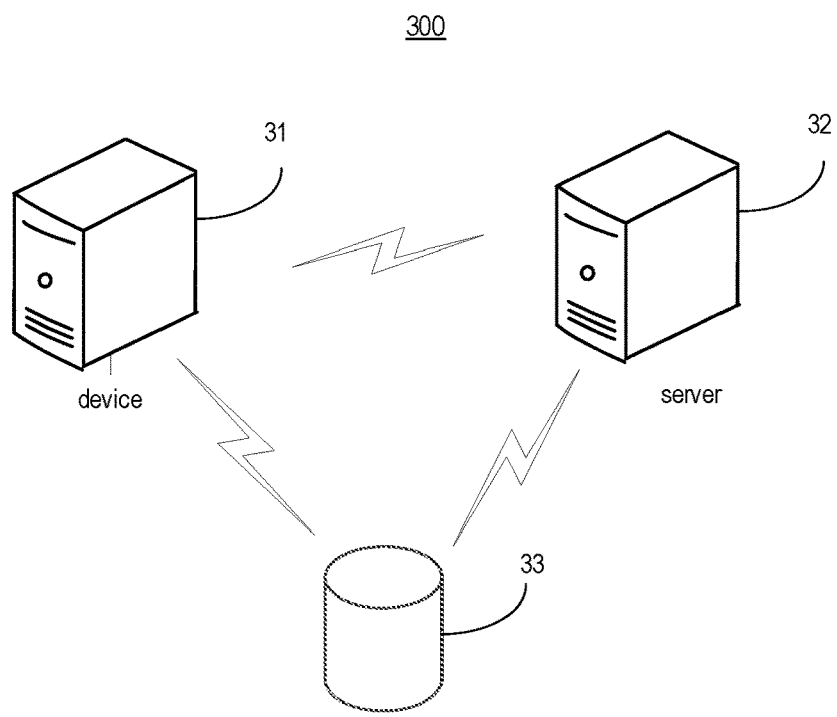
FIG. 3 shows a scenario view describing a method for knowledge base construction, according to an exemplary embodiment.

FIG. 3 shows an exemplary system 300 for constructing a knowledge base describing, for example, nutrients of a food item. The system 300 includes at least a device 31 (e.g., a communication device) and a sever 32 (e.g., web server controlled by a web service application such as Wiki, Baidu, Sina, or Neteasy, and so forth), where the device 31 and the server 32 are in communication through a wireless communication network. The communication network may couple devices so that communications including digital information may be exchanged. The communication network may also include mass storage, such as a database 33, for allowing other devices within the communication network to access information stored on the database. The communication network may include, for example, the Internet, one or more local area networks (LANs), one or more wide area networks (WANs), wire-line type connections, wireless type connections, or any combination thereof.

As shown in FIG. 3, the device 31 may communicate with the server 32 to access a webpage hosted by the server 32. The device may then retrieve text information included on the webpage and parse the text information included on the webpage to determine whether the webpage includes text information identifying a food item. For example, the device may operate a Crawler application to parse the text information included on the webpage. The device 31 may utilize an algorithm for Named Entity Recognition to identify a name of the food item included in the text information. From this, the device 31 may determine whether the retrieved text information includes nutritional information of the identified food item according to a predefined property description pattern. When the nutritional information of the food item are determined to be included in the text information, the nutritional information may be extracted, and a knowledge base for the nutritional information of the food item may be constructed according to the food item and the corresponding nutrients of the food item. The device 31 may also determine whether the text information includes the contents of the nutrients of the food item according to the predefined property description pattern and the nutritional information of the food item. The contents of the nutrients of the food item may be extracted when the contents of the nutrients of the food item are included in the text information, and the contents of the nutrients of the food item may be added correspondingly into the knowledge base so as to construct the knowledge base to include the nutritive values of the food item.

Figure 4:
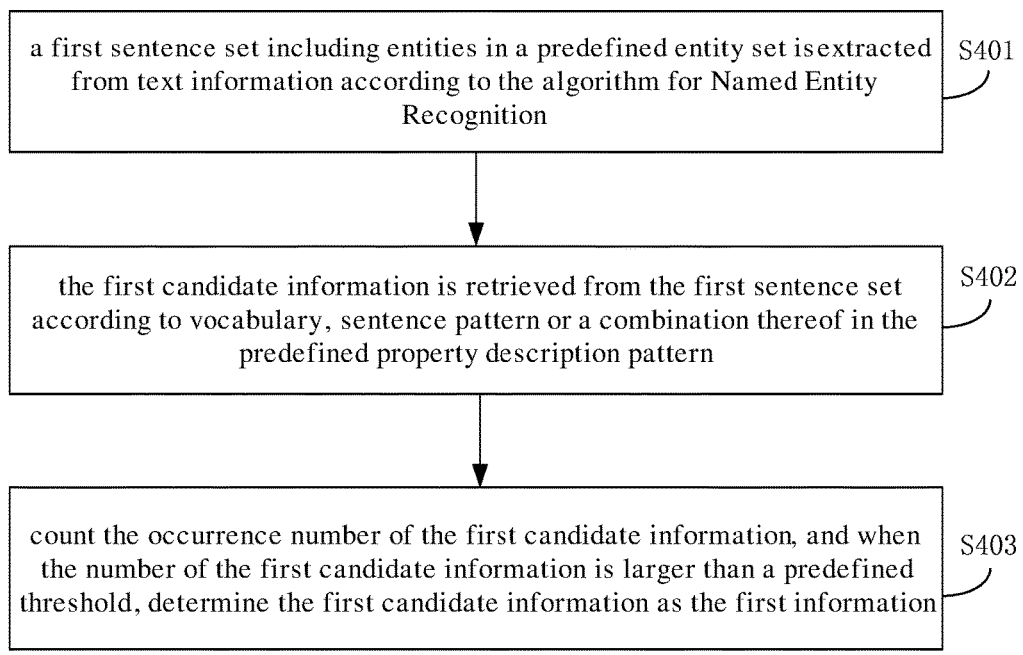
FIG. 4 shows a flow chart describing a method for determining whether text information include first information, according to an exemplary embodiment.

FIG. 4 shows a flow chart 400 of logic describing a method for determining whether text information includes first information, according to an exemplary embodiment.

At 401, a first sentence set including entities from a predefined entity set is extracted from the text information according to the algorithm for Named Entity Recognition.

In an embodiment, the algorithm for Named Entity Recognition may include, but not limited to, Conditional Random Field (CRF), dictionary method and a hybrid method. The predefined entity set may include entities such as a set of food, a set of air and a set of sports.

When a set of food is included as an entity in the predefined entity set, for example, a first sentence set including food may be screened out from the text information based on the CRF method. The first sentence set including food may also be screened out based on a keyword recognition algorithm.

At S402, a first candidate information is retrieved from a first sentence set according to a predetermined set of vocabulary words, a predetermined sentence pattern, or a combination thereof in the predefined property description pattern, wherein the first candidate information includes characteristic information of the entities in the predefined entity set;

Wherein, the predefined property description pattern may be a lexico-syntactic pattern. The lexico-syntactic pattern may include one or more of the following patterns: content of * (e.g. the content of sugar), <contain|contains> <#NUM> grams of * (e.g., contain 20 grams of carbohydrate), * is <contained|included contained rich> <in|within> * (e.g., vitamin C is contained rich in kiwifruit).

After extracting the first sentence set that includes the food item, candidate nutrients may be extracted from the first sentence set based on an application of the predefined property description pattern to the first sentence set. For example, the candidate nutrients retrieved from tomatoes may be carotene, vitamin C, sodium, calcium. The candidate nutrients retrieved from carrots may be carotene, vitamin C, sodium, sugar. The candidate nutrients retrieved from beef may be potassium, phosphorus, sodium, calcium, stone. Please note that "stone," while extracted from the first sentence, will later be determined to not be a valid nutritional information after being analyzed according to the process described below.

At S403, a number of occurrences of a first candidate information may be counted based on the extracted candidate nutrients. The first candidate information may be, for example, a predetermined candidate nutrient, such that a number of times the predetermined candidate nutrient is identified from the extraction of the candidate nutrients at S402 may be determined to be the number of occurrences of the first candidate information. When the occurrence number of the first candidate information is larger than a predefined threshold, the first candidate information may be assigned to be the first information.

The predefined threshold may be flexibly set. In an embodiment, the predefined threshold may be set to be 1 to 10, but the disclosure is not limited herein. The predefined threshold may also be set to be greater than 10 according to a specific application situation.

According to an exemplary embodiment where the predefined threshold is set to 2, when the occurrence number for a particular predetermined candidate nutrient (e.g., stone) is less than 2, while the occurrence number of each of the other candidate nutrients is larger than 2 after counting the occurrence number of each of the candidate nutrients, the predetermined candidate nutrient may be determined not to be nutritional information for a food item, while the other candidate nutrients having their respective occurrence number greater than the predefined threshold of 2 may be determined to be nutritional information for a food item. As such, text information determined not to be describing nutritional information may be removed from the extracted from the first sentence set.

According to some embodiments, the process described for S403 may also be implemented as follows: counting the occurrence number of the first candidate information, and when the occurrence number of the first candidate information is smaller than a predefined threshold, the first candidate information may be determined not to be the first information; otherwise the first candidate information may be determined to be the first information.

The predefined threshold is set to 10 in an exemplary embodiment, but the disclosure is not limited herein. The predefined threshold may also be set to be larger or smaller than 10 according to the specific application situation. When the occurrence number of stone is 1, while the occurrence number of each of the other candidate nutrients is larger than 10 after counting the occurrence number of each of the candidate nutrients, the other candidate nutrients may be determined to be nutritional information while the stone may be determined not to be nutritional information. As such, text information determined not to be describing nutritional information may be removed from the extracted from the first sentence set. In other words, the first candidate information whose occurrence number is small is removed, and thus the text that is determined not to be nutritional information is removed efficiently and the accuracy of the knowledge base is improved.

Figure 5:
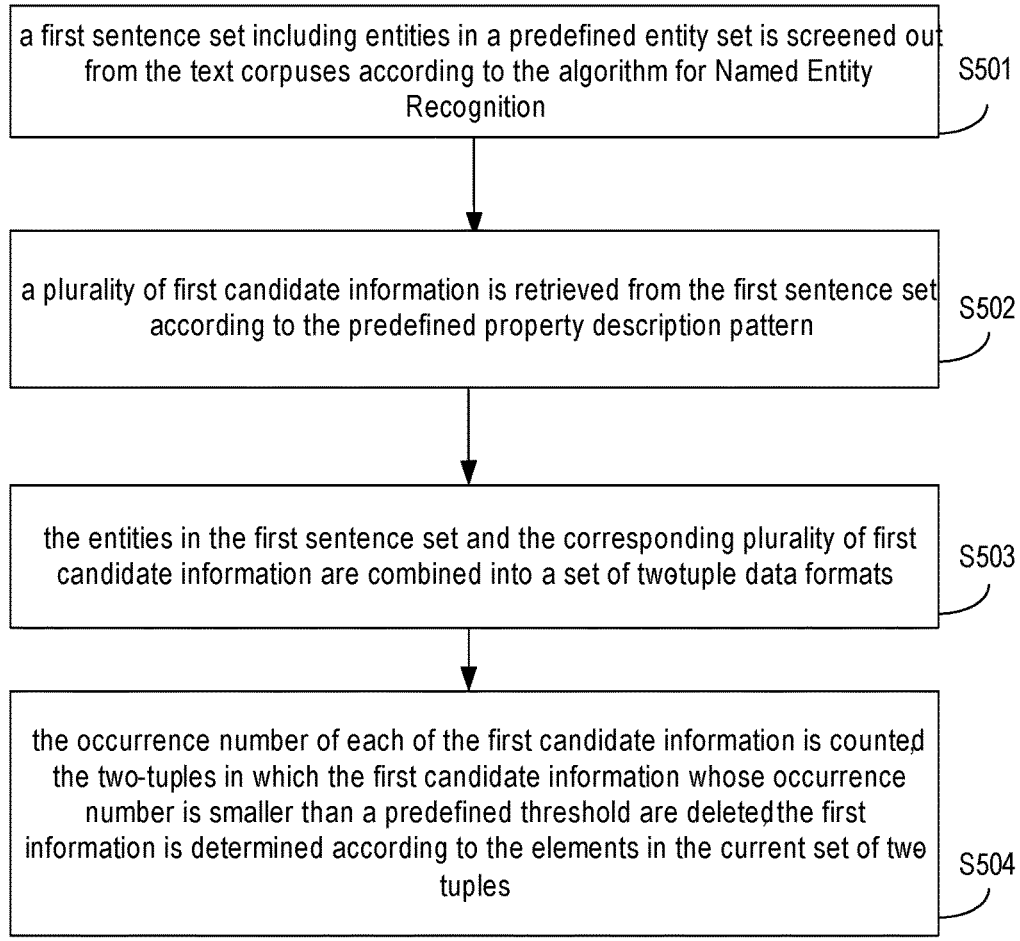
FIG. 5 shows a flow chart describing another method for determining whether the text information include the first information, according to an exemplary embodiment.

FIG. 5 shows a flow chart 500 describing another method for determining whether text information included first information, according to an exemplary embodiment.

At 501, a first sentence set including entities in a predefined entity set may be extracted from the text information according to the algorithm for Named Entity Recognition.

At S502, a plurality of first candidate information may be retrieved from the first sentence set according to the predefined property description pattern, wherein the first candidate information includes characteristic information of the entities.

At 503, the entities in the first sentence set and the corresponding plurality of first candidate information may be combined into a set of two-tuple data formats.

When, for example, the predefined entity set includes a set of food entities E, a sentence set including food entities E may be extracted from the text information, wherein each matched entity within the food entities E may be identified as $E_i$ (words that are matched in both the text information and the food entities E). Candidate nutrients NC may be retrieved according to a lexico-syntactic pattern and combined into a set of two-tuple data formats T. Each element in the set of two-tuples T may be in the format of $(E_i, NC_{ij})$, wherein candidate nutrients NC corresponding to $E_i$ may be $\{NC_{i1}, NC_{i2} \ldots NC_{in}\}$.

At S504, an occurrence number that identifies a number of times each first candidate information is identified from the first sentence set, is determined. The two-tuples in which the first candidate information whose occurrence number is smaller than a predefined threshold exists may be deleted. Accordingly, the first information may be determined according to the elements in the current set of two-tuples.

The occurrence number of each nutrient $NC_{ij}$ may be counted. The two-tuples in which the first candidate information whose occurrence number is smaller than a predefined threshold (such as, 2) may be deleted, so as to generate a new set of two-tuples T. And, the elements included in the current set of two-tuples may be assigned to be the first information.

In the embodiment, the relationship between the entities and the first information is described as being formatted into the two-tuple data format, and thus the first information corresponding to invalid entities may be easily deleted.

Figure 6:
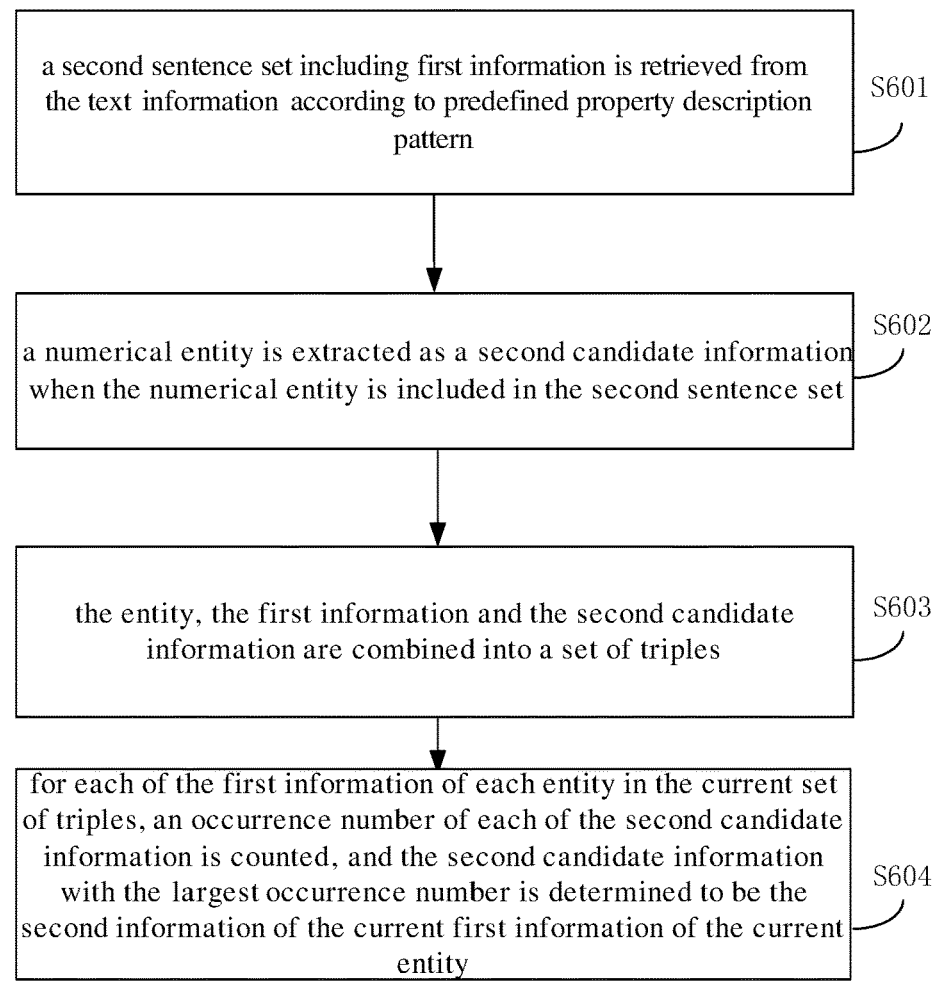
FIG. 6 shows a flow chart describing a method for determining whether the text information include second information, according to an exemplary embodiment.

FIG. 6 shows a flow chart 600 of logic describing a method for determining whether text information includes second information, according to an exemplary embodiment. The method described by flow chart 600 may build upon the method described by flow chart 500.

At S601, a second sentence set including the first information is retrieved from the text information according to a predefined property description pattern. The predefined property description pattern may be a predefined property description pattern described herein.

In the embodiment, the second sentence set includes nutritional information for a food item, and the second sentence set may be retrieved according to the lexico-syntactic pattern.

For example, a sentence set with $E_i$ and $NC_{ij}$ in its context may be screened out from the text information.

At S602, a numerical value is extracted to be assigned the second candidate information when the numerical value is identified to be included in the second sentence set.

Since the content of the nutrient is generally a numerical value, such as "80 grams" of protein, "70%" sugar, or the like, the numerical entity may be extracted from the second sentence set, in order to assign the extracted numerical entity as the second candidate information.

In addition, the content of the nutrient may be measured based on per 100 grams, such as "the banana is of high nutrient, while 20 grams of carbohydrate, 1.2 grams of protein, 0.6 gram of fat are contained per 100 grams". The content of the nutrient may also be measured based on other set measurement amounts.

At S603, the entity, the first information, and the second candidate information may be combined into a set of triples as a data format.

At S604, for each first information of each entity in the current set of triples, an occurrence number of each of the relevant second candidate information that is identified from the second sentence set may be counted, and the second candidate information with the highest occurrence number may be assigned to be the second information of the current first information of the current entity.

The entity, the first information, and the second candidate information may be combined into a set of triples. After that, for each first information of each entity in the current set of triples, an occurrence number of each of the relevant second candidate information may be counted, and the second candidate information with the biggest occurrence number may be assigned to be the second information of the current first information of the current entity.

For example, after the numerical entity is extracted from the second sentence set, the set $T_r$ of triples may be created, and the elements in the set are of the data format $(E_i, NC_{ij}, V_{ijk})$, wherein the content of candidate nutrient $NC_{ij}$ corresponding to $E_i$ is $\{V_{ij1}, V_{ij2} \ldots V_{ijm}\}$. Subsequently, for the content $V_{ijk}$ of each nutrient $NC_{ij}$ of each $E_i$, a number of times the second candidate information can be identified as occurring in $\{V_{ij1}, V_{ij2} \ldots V_{ijm}\}$ is counted. Then, only the triples where the occurrence number of $V_{ijk}$ is the largest is retained, while all the other $V_{ijr}$ are deleted from $\{V_{ij1}, V_{ij2}, \ldots V_{ijm}\}$. That is, all the other $V_{ijr}$ may be deleted from the set of triples $T_r$, so as to generate a new set of triples $T_r$. The candidate content included in the current $T_r$ may be assigned as the content of the corresponding nutrient of food.

The relationship among the entities, the first information and the second information is clarified by illustrated in the form of triples, and thus the second information corresponding to the first information may be more easily retrieved, for example, the content corresponding to the nutrients of food is more easily to be retrieved.

Assuming that the occurrence number extracted from the text information of "the content of vitamin A in tomatoes is 10 grams" is 50, the occurrence number of "the content of vitamin A in tomatoes is 8 grams" is 10, and the occurrence number of "the content of vitamin A in tomatoes is 1 gram" is 3. Since 50 is the larger number, the content of vitamin A in tomatoes may be determined to be 10 grams and not 1 gram.

In the above embodiment, the occurrence number of the retrieved second candidate information is counted, and the second candidate information determined to have the largest occurrence number is determined to be the second information. Therefore, the accuracy of the second information is improved, and in turn the accuracy of the knowledge base is improved.

In accordance with the above embodiments of methods for knowledge base construction, embodiments of devices for knowledge base construction are also provided.

Figure 7:
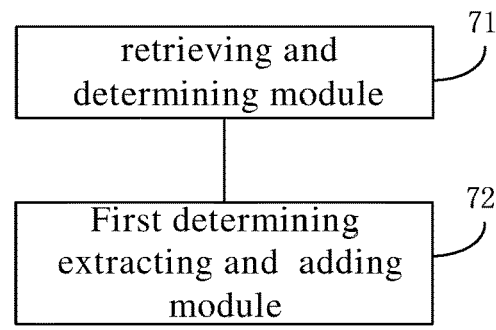
FIG. 7 shows a schematic diagram illustrating a device for knowledge base construction, according to an exemplary embodiment.

FIG. 7 shows a schematic diagram of a device 700 configured to construct a knowledge base, according to an exemplary embodiment. Referring to FIG. 7, the device 700 includes a retrieving and determining module 71 and a first determining, extracting and adding module 72.

The retrieving and determining module 71 may be configured to retrieve text information, and determine whether the text information includes a first information according to a predefined property description pattern, wherein the first information includes characteristic information of entities in a predefined entity set.

The first determining, extracting and adding module 72 may be configured to extract first information, when the first information is determined to be included in the text information, and construct the knowledge base based on the first information and an entity corresponding to the first information.

A process for the device 700 to construct the knowledge base may be described by the method described by flow chart 100 shown in FIG. 1.

In the above embodiment of the device 700, the text information may be retrieved by the retrieving and determining module 71. The first information may be extracted by the first determining, extracting and adding module 72 when the first information is included in the text information. And the knowledge base may be constructed according to the first information and the corresponding entities. As can be seen, the knowledge base may be constructed automatically, and thus manual steps are avoided and the speed of knowledge base construction is improved.

Figure 8:
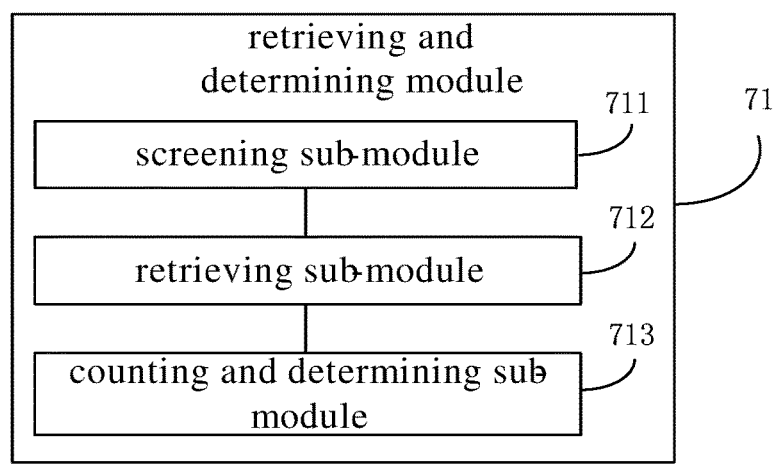
FIG. 8 shows a schematic diagram illustrating another device for knowledge base construction, according to an exemplary embodiment.

FIG. 8 shows a schematic diagram illustrating another device for knowledge base construction, according to an exemplary embodiment. In particular, FIG. 8 shows the retrieving and determining module 71 from device 700, where the retrieving and determining module 71 is shown to include a screening sub-module 711, a retrieving sub-module 712 and a counting and determining sub-module 713.

The screening sub-module 711 may be configured to extract, from the text information, a first sentence set including the entities in the predefined entity set, according to an algorithm for Named Entity Recognition.

The retrieving sub-module 712 may be configured to retrieve a first candidate information from the first sentence set according to a predetermined set of vocabulary words, a predetermined sentence pattern, or the combination thereof in the predefined property description pattern, wherein the first candidate information includes the characteristic information of the entities in the predefined entity set.

The counting and determining sub-module 713 may be configured to count an occurrence number of the first candidate information, and determine the first candidate information as the first information when the occurrence number is larger than a predefined threshold.

A process for the retrieving and determining module 71 shown in FIG. 8 to construct the knowledge base may be described by the method described by flow chart 200 shown in FIG. 2.

In the above embodiment, the occurrence number of the retrieved first candidate information may be counted by the counting and determining sub-module 713. The first candidate information may be determined to be the first information when the occurrence number is larger than a predefined threshold, that is, the first candidate information with few occurrence may be removed. Thus the matter not belonging to nutrients of food is removed efficiently and the accuracy of the knowledge base is enhanced.

Figure 9:
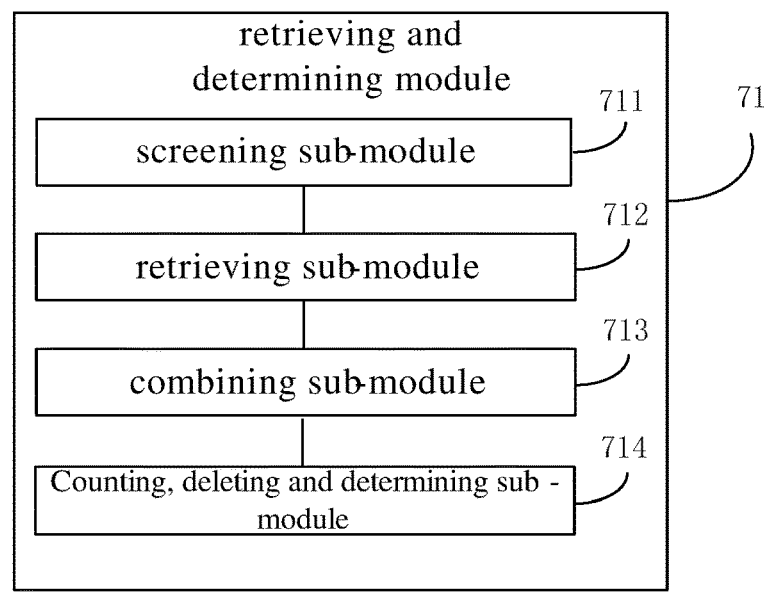
FIG. 9 shows a schematic diagram illustrating another device for knowledge base construction, according to an exemplary embodiment.

FIG. 9 shows a schematic diagram illustrating another device for knowledge base construction, according to an exemplary embodiment. In particular, FIG. 9 shows the retrieving and determining module 71 as including a screening sub-module 711, a retrieving sub-module 712, a combining sub-module 713, and a counting, deleting and determining sub-module 714.

The screening sub-module 711 may be configured to extract, from the text information, a first sentence set including the entities in the predefined entity set according to an algorithm for Named Entity Recognition.

The retrieving sub-module 712 may be configured to retrieve a plurality of first candidate information from the first sentence set gained by the filtering sub-module 711 according to the predefined property description pattern, wherein the first candidate information includes the characteristic information of the entities.

The combining sub-module 713 may be configured to combine the entities included in the first sentence set and the corresponding plurality of first candidate information into a set of two-tuples.

The counting, deleting and determining sub-module 714 may be configured to count an occurrence number of each of the first candidate information, delete two-tuples in which the first candidate information whose occurrence number is smaller than a predefined threshold exists, and determine elements included in the current set of two-tuples as the first information.

Wherein, the predefined property description pattern comprises vocabularies, sentence patterns or any combination thereof for determining whether the text information include the first information.

A process for the device shown in FIG. 9 to construct the knowledge base may be described by the method described by flow chart 500 shown in FIG. 5.

In the above embodiment, the relationship between the entities and the first information is clarified as illustrated in the data format of the two-tuples, and thus the first information corresponding to invalid entities is more easily deleted.

Figure 10:
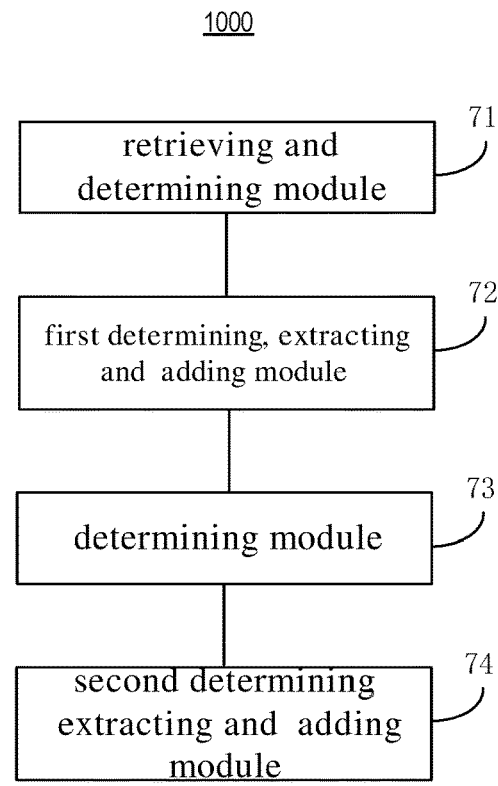
FIG. 10 shows a schematic diagram illustrating another device for knowledge base construction, according to an exemplary embodiment.

FIG. 10 shows a schematic diagram describing another device 1000 for knowledge base construction, according to an exemplary embodiment. As shown in FIG. 10, the device 1000 for knowledge base construction may also include a determining module 73 and a second determining, extracting and adding module 74. The device 1000 may build upon the components included in the device 700 illustrated in FIG. 7.

The determining module 73 may be configured to determine whether the text information includes second information according to the predefined property description pattern and the first information, wherein the second information includes the characteristic information of the first information.

The second determining, extracting and adding module 74 may be configured to extract the second information if it is determined to be included in the text information, and update the knowledge base based on the first information, the second information, and the entity corresponding to the first information.

A process for the device 1000 shown in FIG. 10 to construct the knowledge base may be described by the method described by flow chart 200 shown in FIG. 2.

Figure 11:
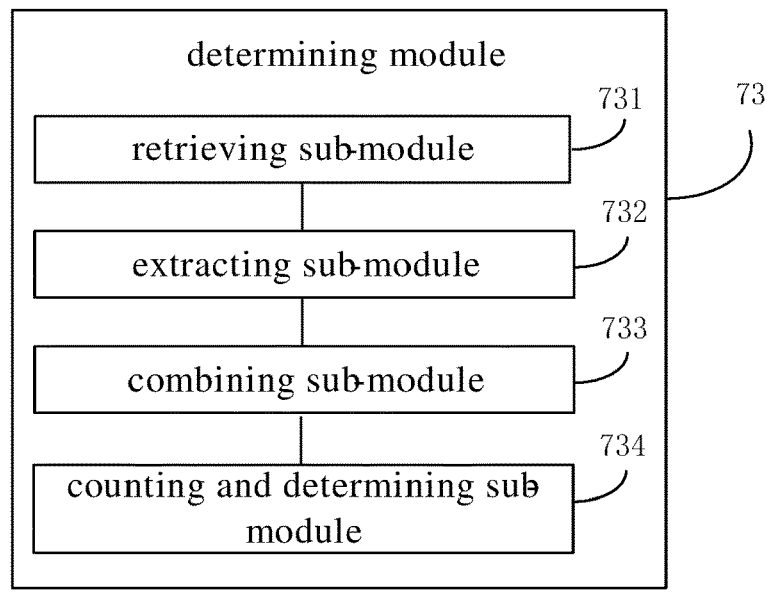
FIG. 11 shows a schematic diagram illustrating another device for knowledge base construction, according to an exemplary embodiment.

FIG. 11 shows a schematic diagram describing another device for knowledge base construction, according to an exemplary embodiment. In particular, FIG. 11 shows the determining module 73 as including a retrieving sub-module 731, an extracting sub-module 732, a combining sub-module 733, and a counting and determining sub-module 734.

The retrieving sub-module 731 may be configured to retrieve, from the text information, a second sentence set including the first information according to the predefined property description pattern.

The extracting sub-module 732 may be configured to extract a numerical entity as a second candidate information when the second sentence set retrieved by the retrieving sub-module 731 includes the numerical entity.

The combining sub-module 733 may be configured to combine the entities, the first information, and the second candidate information extracted by the extracting sub-module 732 into a set of triples.

The counting and determining sub-module 734 may be configured to for each of the first information of each entity in the current set of triples combined by the combining sub-module 733, count an occurrence number each of the corresponding second candidate information, and determine second candidate information whose occurrence number is the largest as the second information of the current first information of the current entity.

A process for the device shown in FIG. 11 to construct the knowledge base may be described by the method described by flow chart 600 shown in FIG. 6.

In the above embodiment, the relationship among the entities, the first information and the second information is clarified and illustrated in the data format of the triples, and thus the second information of the first information corresponding to the entity is more easily to be achieved.

With respect to the devices in the above embodiments, the specific manners for performing operations for individual modules and sub-modules therein have been described in details in the embodiments regarding the methods, which will not be elaborated herein. The modules, and sub-modules, may be representative of software, hardware, middleware, and/or circuitry for implementing the features described as being implemented by the respective modules, and sub-modules.

Figure 12:
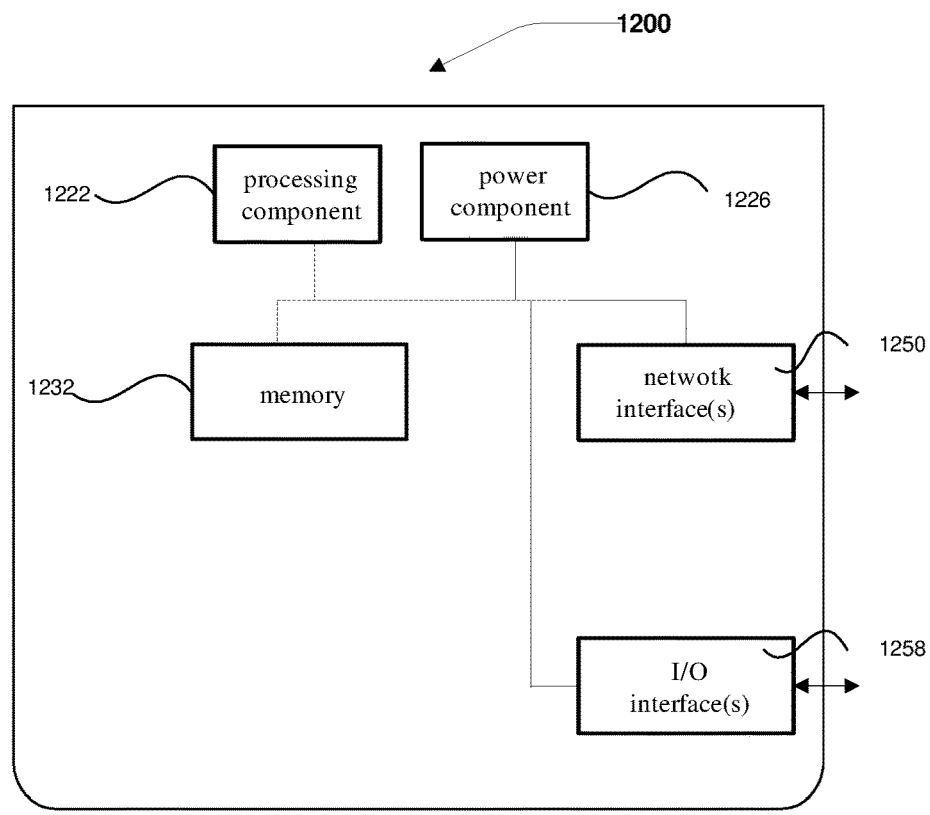
FIG. 12 shows a schematic diagram illustrating a device for knowledge base construction, according to an exemplary embodiment.

FIG. 12 shows a block diagram of a device 1200 for knowledge base construction, according to an exemplary embodiment. For example, the device 1200 may be a server. The device 1200 includes a processing component 1222 which may further include one or more processors, and the memory resources presented by memory 1232 for storing the instructions executable by processing component 1222, such as application programs. The application programs stored in memory 1232 may comprise one or more modules; each of them corresponds to a set of instructions. Further, the processing component 1222 may be configured to execute the sets of instructions and perform one or more of the methods for the knowledge base construction described herein.

The device 1200 may also include a power component 1226 which is configured to perform the power management of device 1200, a wired or wireless network interface 1250 which is configured to enable the device 1200 be connected to the network, and an input/output (I/O) interface 1258. The device 1200 may be operated based on an operating systems stored on memory 1232, such as Windows Server™, Mac OS X™, Unix™, Linux™, FreeBSD™, or the like.

Other embodiments will be apparent to those skilled in the art from consideration of the specification and practice of the features disclosed here. This disclosure is intended to cover any variations, uses, or adaptations of the features following the general principles thereof and including such departures from the present disclosure as come within known or customary practice in the art. It is intended that the specification and examples be considered as exemplary only, with a true scope and spirit of the features being indicated by the following claims.

What is claimed is:

1. A computer implemented method for constructing a knowledge base, comprising:

retrieving, by a network interface, text information from a remote server;

retrieving, by the network interface, a predefined property description pattern from a database, wherein the predefined property description pattern is a data format created to identify relationships between characteristic information and an entity included in a predefined entity set, and wherein the predefined property description pattern includes at least one of a predetermined set of vocabulary words or a predetermined sentence pattern, configured to determine whether the text information includes a first information, wherein the first information includes the characteristic information corresponding to the entity included in the predefined entity set;

comparing the text information to the predefined property description pattern;

extracting, from the text information, a first sentence set including the entity, according to a named entity recognition protocol;

retrieving first candidate information from the first sentence set according to the predefined property description pattern, wherein the first candidate information includes the characteristic information corresponding to the entity included in the predefined entity set;

counting a number of occurrences of the first candidate information in the first sentence set;

assigning the first candidate information as the first information when the number of occurrences is greater than a predefined threshold; and constructing a knowledge base based on the first information and an entity corresponding to the first information.

2. The method of claim 1, further comprising:

determining whether the text information includes second information based on the predefined property description pattern and the first information, wherein the second information includes characteristic information corresponding to the entity included in the predefined entity set;

extracting the second information from the text information when the second information is determined to be included in the text information; and updating the knowledge base based on the first information, the second information, and the entity corresponding to the first information.

3. The method of claim 2, wherein determining whether the text information includes the second information comprises:

retrieving, from the text information, a second sentence set including the first information based on the predefined property description pattern;

when the second sentence set includes a numerical entity, extracting the numerical entity from the second sentence set and assigning the numerical entity as second candidate information;

combining the entity corresponding to the first information, the first information and the second information into a set of triples;

for each of the first information of each entity in a current set of triples, counting number of occurrences of each of a respective second candidate information; and assigning second candidate information having a largest number of occurrences as the second information of the first information of the entity.

4. The method of claim 3, wherein the predefined property description pattern includes one or more of: content of *, <contain|contains><#NUM>grams of *, * is <contained|included|contained rich><in|within>*, where "*" is a wildcard character for matching any string, "|" is a symbol indicating "or", "<#NUM>" is a symbol for matching a numerical string, and "<" and ">" appear in pairs to contain multiple synonyms.

5. The method of claim 1, wherein the predefined property description pattern includes at least one of: content of *, <contain|contains><#NUM>grams of *, * is <contained|included|contained rich><in|within>*, where "*" is a wildcard character for matching any string, "|" is a symbol indicating "or", "<#NUM>" is a symbol for matching a numerical string, and "<" and ">" appear in pairs to contain multiple synonyms.

6. A device for knowledge base construction, comprising:
a processor; and
a memory configured to store processor executable instructions;
wherein the processor is configured to execute the instructions to:
retrieve text information;
retrieve, by a network interface, a predefined property description pattern from a database, wherein the predefined property description pattern is a data format created to identify relationships between characteristic information and an entity included in a predefined entity set, and wherein the predefined property description pattern includes at least one of a predetermined set of vocabulary words or a predetermined sentence pattern, configured to determine whether the text information includes a first information, wherein the first information includes the characteristic information corresponding to the entity included in the predefined entity set;

compare the text information to the predefined property description pattern;

extract, from the text information, a first sentence set including the entity, according to a named entity recognition protocol;

retrieve first candidate information from the first sentence set according to the predefined property description pattern, wherein the first candidate information includes the characteristic information corresponding to the entity included in the predefined entity set;

count a number of occurrences of the first candidate information in the first sentence set;

assign the first candidate information as the first information when the number of occurrences is greater than a predefined threshold; and construct the knowledge base based on the first information and an entity corresponding to the first information.

7. The device of claim 6, wherein the processor is further configured to execute the instructions to:

determine whether the text information includes second information based on the predefined property description pattern and the first information, wherein the second information includes characteristic information corresponding to the entity included in the predefined entity set;

extract the second information from the text information when the second information is determined to be included in the text information; and update the knowledge base based on the first information, the second information, and the entity corresponding to the first information.

8. The device of claim 7, wherein the processor is further configured to execute the instructions to:

retrieve, from the text information, a second sentence set including the first information based on the predefined property description pattern;

when the second sentence set includes a numerical entity, extract the numerical entity from the second sentence set and assigning the numerical entity as second candidate information;

combine the entity corresponding to the first information, the first information and the second information into a set of triples;

for each of the first information of each entity in a current set of triples, count number of occurrences of each of a respective second candidate information; and assigning second candidate information having a largest number of occurrences as the second information of the first information of the entity.

9. The device of claim 6, wherein the predefined property description pattern includes at least one of: content of *, <contain|contains><#NUM>grams of *, * is <contained|included|contained rich><in|within>*, where "*" is a wildcard character for matching any string, "|" is a symbol indicating "or", "<#NUM>" is a symbol for matching a numerical string, and "<" and ">" appear in pairs to contain multiple synonyms.

10. A computer implemented method for constructing a knowledge base, the method comprising:

retrieving, by a network interface, text information from a remote server;

retrieving, by the network interface, a predefined property description pattern from a database, wherein the predefined property description pattern is a data format created to identify relationships between characteristic information and an entity included in a predefined entity set, and wherein the predefined property description pattern includes at least one of a predetermined set of vocabulary words or a predetermined sentence pattern, configured to determine whether the text information includes a first information, wherein the first information includes the characteristic information corresponding to the entity included in the predefined entity set;

comparing the text information to the predefined property description pattern;

extracting, from the text information, a first sentence set including the entity according to a named entity recognition protocol;

retrieving, from the first sentence set, a plurality of first candidate information according to the predefined property description pattern, wherein the plurality of first candidate information includes the characteristic information for a plurality of entities in the predefined entity set that are included in the first sentence set;

combining the entities included in the first sentence set and a corresponding plurality of first candidate information into a set of two-tuple data sets;

counting a number of occurrences of each of the first candidate information;

deleting data sets in which the number of occurrences of the first candidate information is less than a predefined threshold exists;

assigning elements included in the remaining two-tuple data set as the first information; and constructing a knowledge base based on the first information and an entity corresponding to the first information.

11. The method of claim 10, further comprising:

determining whether the text information includes second information based on the predefined property description pattern and the first information, wherein the second information includes characteristic information corresponding to the entity included in the predefined entity set;

extracting the second information from the text information when the second information is determined to be included in the text information; and updating the knowledge base based on the first information, the second information, and the entity corresponding to the first information.

12. The method of claim 10, wherein the predefined property description pattern includes at least one of: content of *, <contain|contains><#NUM>grams of *, * is <contained|included|contained rich><in within>*, where "*" is a wildcard character for matching any string, "|" is a symbol indicating "or", "<#NUM>" is a symbol for matching a numerical string, and "<" and ">" appear in pairs to contain multiple synonyms.

13. A device for knowledge base construction, comprising:

a processor; and a memory configured to store processor executable instructions;

wherein the processor is configured to execute the instructions to:

retrieve text information;

retrieve, by a network interface, a predefined property description pattern from a database, wherein the predefined property description pattern is a data format created to identify relationships between characteristic information and an entity included in a predefined entity set, and wherein the predefined property description pattern includes at least one of a predetermined set of vocabulary words or a predetermined sentence pattern, configured to determine whether the text information includes first information;

compare the text information to the predefined property description pattern;

extract, from the text information, a first sentence set including the entity according to a named entity recognition protocol;

retrieve, from the first sentence set, a plurality of first candidate information according to the predefined property description pattern, wherein the plurality of first candidate information includes the characteristic information for a plurality of entities in the predefined entity set that are included in the first sentence set;

combine the entities included in the first sentence set and a corresponding plurality of first candidate information into a set of two-tuple data sets; and count a number of occurrences of each of the first candidate information;

delete data sets in which the number of occurrences of the first candidate information is less than a predefined threshold exists;

assigning elements included in the remaining two-tuple data set as the first information; and construct the knowledge base based on the first information and an entity corresponding to the first information.

14. The device of claim 13, wherein the processor is further configured to execute the instructions to:

determine whether the text information includes second information based on the predefined property description pattern and the first information, wherein the second information includes characteristic information corresponding to the entity included in the predefined entity set;

extract the second information from the text information when the second information is determined to be included in the text information; and update the knowledge base based on the first information, the second information, and the entity corresponding to the first information.

15. The device of claim 13, wherein the predefined property description pattern includes at least one of: content of *, <contain|contains><#NUM>grams of *, * is <contained|included|contained rich><in|within>*, where "*" is a wildcard character for matching any string, "|" is a symbol indicating "or", "<#NUM>" is a symbol for matching a numerical string, and "<" and ">" appear in pairs to contain multiple synonyms.

* * * * *